(12) United States Patent (10) Patent No.: US 9,104,321 B2
Cudak et al. (45) Date of Patent: Aug. 11, 2015

(54) REDUNDANT ARRAY OF INDEPENDENT DISKS (RAID) SYSTEM BACKUP MANAGEMENT

(71) Applicant: International Business Machines Corporation, Armonk, NY (US)

(72) Inventors: Gary D. Cudak, Creedmoor, NC (US); Lydia M. Do, Raleigh, NC (US); Christopher J. Hardee, Raleigh, NC (US); Adam Roberts, Moncure, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 172 days.

(21) Appl. No.: 13/936,246

(22) Filed: Jul. 8, 2013

(65) Prior Publication Data

US 2015/0012775 A1 Jan. 8, 2015

Related U.S. Application Data

(63) Continuation of application No. 13/934,830, filed on Jul. 3, 2013.

(51) Int. Cl.
  *G06F 12/00* (2006.01)
  *G06F 3/06* (2006.01)
  *G06F 11/14* (2006.01)
  *G06F 11/20* (2006.01)

(52) U.S. Cl.
  CPC ............ *G06F 3/0619* (2013.01); *G06F 3/0665* (2013.01); *G06F 3/0689* (2013.01); *G06F 11/1458* (2013.01); *G06F 11/2046* (2013.01)

(58) Field of Classification Search
  None
  See application file for complete search history.

(56) References Cited

U.S. PATENT DOCUMENTS

| | | | |
|---|---|---|---|
| 6,223,252 B1 | 4/2001 | Bandera et al. | |
| 7,266,717 B2 | 9/2007 | Cassell et al. | |
| 2004/0019824 A1 | 1/2004 | McCombs | |
| 2007/0067670 A1 | 3/2007 | Ebsen et al. | |
| 2008/0155316 A1* | 6/2008 | Pawar et al. | 714/8 |
| 2012/0226935 A1 | 9/2012 | Kishore et al. | |
| 2014/0122744 A1* | 5/2014 | Madhusudana et al. | 710/2 |

OTHER PUBLICATIONS

Lockwood, J.E., Moving Beyond RAID and XRAID2; Netgear ReadyNAS Community Forum; Apr. 3, 2012.
Inspec: Hardware and Software RAID in Microsoft Windows NT; AN-6122702; Pentakalos, O. et al.; 1998.
Miller, Scott Alan; Hot Spare of a Hot Mess; SMB IT Journal/Blog Archive; Jul. 16, 2012.
RAID—How long should rebuilding 250GB take?—Server Fault Sep. 23, 2011.
SAS RAID Controllers for AIX, IBM Corporation, 2010, 2012.
Intel RAID Software User's Guide; Intel Corporation; Jul. 2007.
Time for a RAID-5 rebuild—Storage Forums; Mar. 14, 2008-Apr. 3, 2013.
Wikipedia, the free encyclopedia, definition of RAID; last accessed Apr. 3, 2013.

* cited by examiner

*Primary Examiner* — Brian Peugh
(74) *Attorney, Agent, or Firm* — Olive Law Group, PLLC

(57) ABSTRACT

Disclosed herein are RAID backup management systems and methods. According to an aspect, a method may include identifying portions of data in each of multiple storage units of a RAID system. The method may also include backing up data in the identified portions to a hot spare. Further, the method may include allocating storage space in the hot spare for the backup based on detection of errors among the storage units.

8 Claims, 3 Drawing Sheets

REDUNDANT ARRAY OF INDEPENDENT DISKS (RAID) SYSTEM BACKUP MANAGEMENT

CROSS REFERENCE TO RELATED APPLICATION

This is a continuation application of co-pending U.S. patent application Ser. No. 13/934,830, filed Jul. 3, 2013, and titled REDUNDANT ARRAY OF INDEPENDENT DISKS (RAID) SYSTEM BACKUP management, the content of which is hereby incorporated by reference in its entirety.

BACKGROUND

1. Field of the Invention

The present invention relates to disk drive systems, and more specifically, to redundant array of independent disks (RAID) system backup management.

2. Description of Related Art

RAID is a technology used to improve the input/output performance and reliability of mass storage devices. A RAID array incorporates fault tolerance by using a redundant architecture, and the disk controller which controls a RAID array may be referred to as a RAID controller. In RAID systems, data is stored across multiple storage units (e.g., disks in order to provide immediate access to the data despite the failure of one or more storage units. Data is distributed across the storage units in one of several ways called "RAID levels," depending on the level of redundancy and performance required. The different RAID schemes or architectures are named by the word RAID followed by a number (e.g., RAID 0, RAID 1, etc.). Each scheme can provide a different balance between reliability, availability, performance, and capacity.

RAID 5 distributes parity along with the data and requires all storage units but one to be present to operate. The array is not destroyed by failure of a single storage unit. Upon drive failure, any subsequent reads can be calculated from distributed parity such that the storage unit failure is masked from the end user. Systems running large-capacity, storage units in RAID 5 can encounter long rebuild times in the event a storage unit fails and the array needs to be rebuilt. This problem is prevalent and noticeable in the information technology (IT) industry for example. For at least this reason, there is a need for systems and techniques that improve the reliability of RAID systems and the time in which they can be rebuilt after failure.

BRIEF SUMMARY

In accordance with one or more embodiments of the present invention, methods and systems disclosed herein provide for RAID backup management. According to an aspect, a method may include identifying portions of data in each of multiple storage units of a RAID system. The method may also include backing up data in the identified portions to a hot spare. Further, the method may include allocating storage space in the hot spare for the backup based on detection of errors among the storage units.

DETAILED DESCRIPTION

As described herein, there are various embodiments and aspects of the present invention. According to embodiments, the present invention is directed to systems and methods for RAID backup management.

Figure 1:
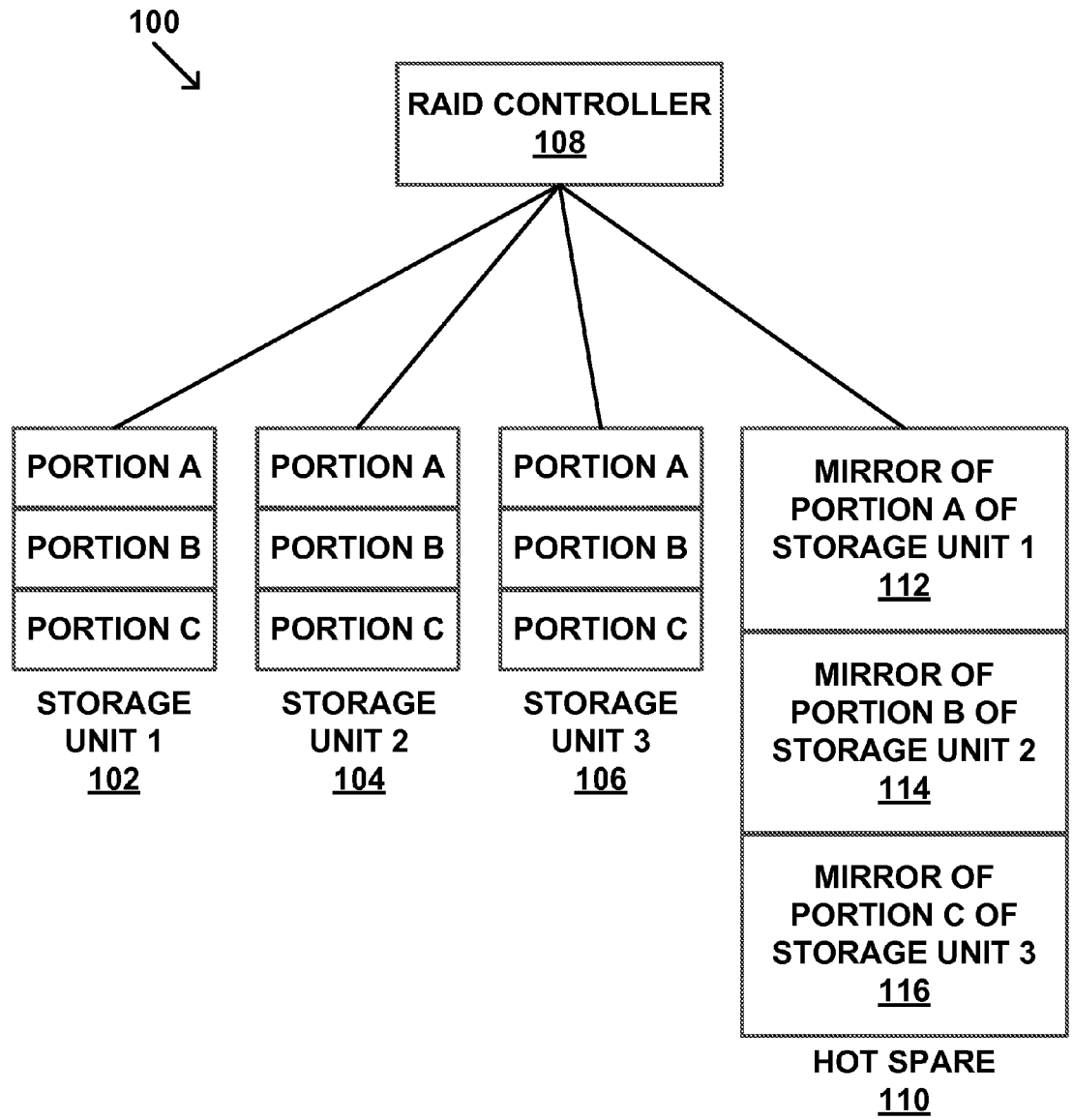
FIG. 1 is a block diagram of an example RAID system operable for backup management in accordance with embodiments of the present invention.

Referring now to FIG. 1, the figure illustrates a block diagram of an example RAID system 100 operable for backup management in accordance with embodiments of the present invention. In this example, the system 100 is a RAID 5 system, although the techniques and embodiments disclosed herein may be applied to any other suitable RAID system such as a RAID 6 system. The system 100 uses block-level striping with parity data distributed across member storage units 1, 2, and 3, which are designated 102, 104, and 106, respectively. Storage units 102, 104, and 106 may be drives, disks, or any other suitable unit for storing data.

The system 100 may include a RAID controller 108 configured to read from and write data to the storage units 102, 104, and 106. In this example, there are three (3) storage units, although any suitable number may be utilized. The RAID controller 108 may implement "striping" technology whereby storage units 102, 104, and 106 are combined into one logical storage unit. Striping partitions the storage space of each storage unit into stripes of various sizes (e.g., 512 bytes, multiple megabytes, etc.). These stripes may be interleaved in a rotating sequence such that the combined space is composed alternatively of stripes from each storage unit.

The RAID controller 108 may implement parity computations to provide for fault tolerance by calculating the data in two of the storage units 102, 104, and 106 and storing the results in the other storage unit. The parity may be computed by XOR'ing a bit from one storage unit with a bit from another storage unit, and storing the results on the third storage unit. The parity information may be distributed among any of the storage units within a corresponding stripe. This information may be used by the RAID controller 108 as described herein for managing backup of data for the storage units.

The RAID controller 108 may be implemented by hardware, software, firmware, or combinations thereof. For example, the RAID controller 108 may be implemented by one or more processors and memory. In an example, the RAID controller 108 may be implemented by an operating system.

Figure 2:
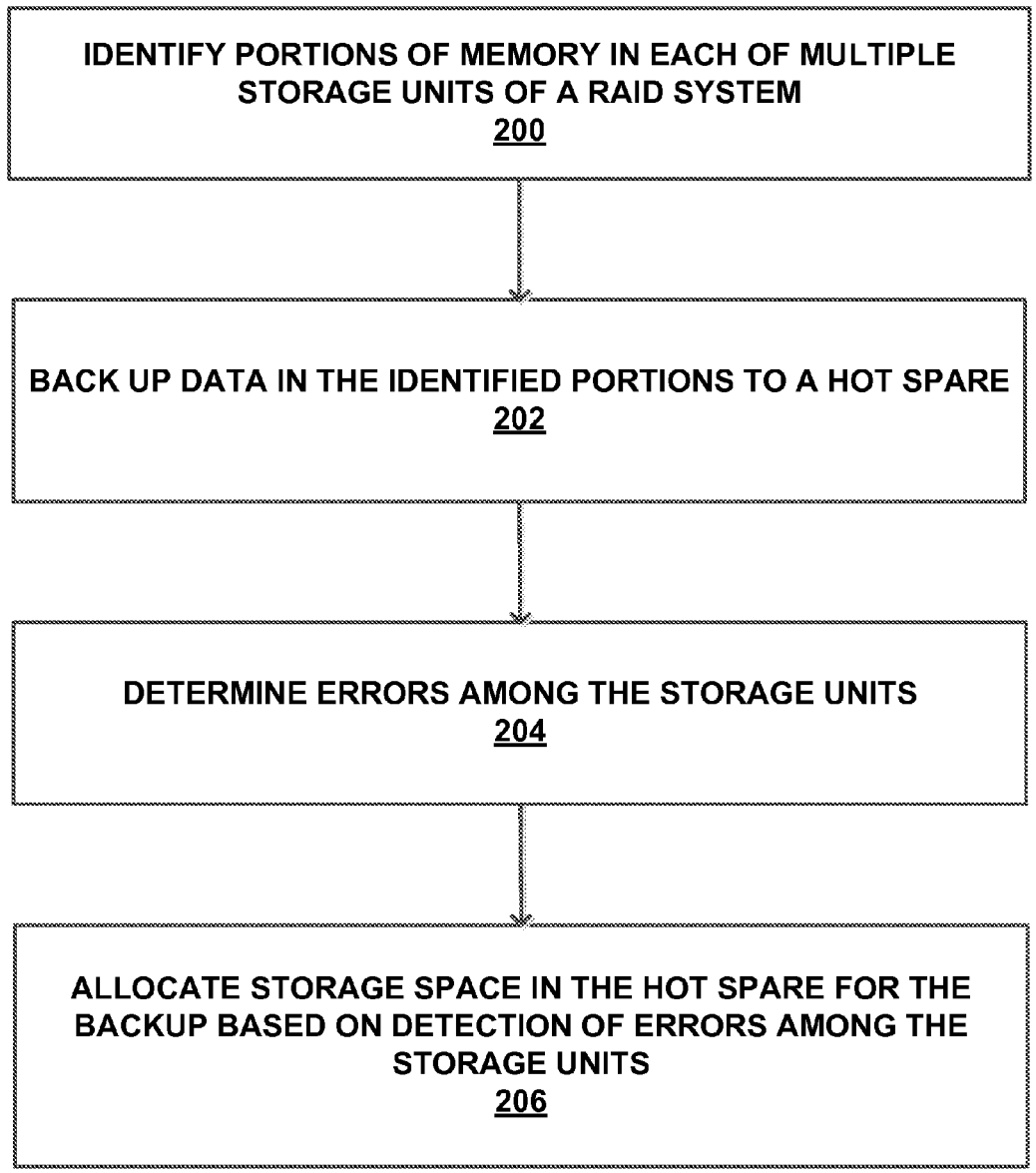
FIG. 2 is a flowchart of an example method for RAID backup management in accordance with embodiments of the present invention.

FIG. 2 illustrates a flowchart of an example method for RAID backup management in accordance with embodiments of the present invention. In examples described herein to illustrate the method, reference is made to the RAID controller 108 shown in FIG. 1, although any suitable controller may be utilized. Further, the method is described in examples as being implemented in a RAID 5 system with the components shown in FIG. 1, although the method may be implement in any suitable RAID system.

Referring now to FIG. 2, the method includes identifying 200 portions of data in each of multiple storage units of a RAID system. The portions may each be associated with different stripes of data. For example, in the system 100 shown in FIG. 1, portions are designated A in each storage unit 102, 104, and 106, and these portions correspond to the same stripes of data. Similarly, portions B of storage units 102, 104, and 106 correspond to the same stripes of data across the storage units. This is also the case with portions C of storage units 102, 104, and 106. The RAID controller 108 is configured to distinguish and identify such portions. For example, the RAID controller 108 may identify portion A of storage unit 1 102, portion B of storage unit 2 104, and portion C of storage unit 3 106.

As an example, portions may be identified in any suitable manner. The size of each portion may be equal or any other suitable size in relation to one another. Watermarks may be used to track rebuild status. If a drive has failures or appears to be likely to fail, that drive may receive a larger portion of data placed on the hot spare. The data that gets added simply extends from the addressable range already on the hot spare. Individual stripes on other sections of the drive may be used as well if track watermarks are tracked for each section that get moved onto the hot spare device.

The method of FIG. 2 includes backing up 202 data in the identified portions to a hot spare. Continuing the aforementioned example, the RAID controller 108 may back up the data contained in portion A of storage unit 1 102, portion B of storage unit 2 104, and portion C of storage unit 3 106 to a hot spare 110. Particularly, the RAID controller 108 may control the copying of portion A of storage unit 1 102 to a portion 112 of the hot spare 110. Similarly, the RAID controller 108 may control the copying of the data contained in portions B and C of storage units 104 and 106, respectively, to portions 114 and 116 of the hot spare 110. Further, as data in these portions of storage units 102, 104, and 106 is overwritten or otherwise changed, corresponding updates may be made to the mirrored data within the hot spare 110.

The method of FIG. 2 includes determining 204 errors among the storage units. Continuing the aforementioned example, one of the storage units 102, 104, and 106 may fail. In this example, storage unit 102 may fail, and the failure may be determined by the RAID controller 108.

The method of FIG. 2 includes allocating 206 storage space in the hot spare for the backup on detection of errors among the storage units. Continuing the aforementioned example, the data of portion A of failed storage unit 102 is backed up in the hot spare 110. Thus, there is no need to rebuild the portion A data of the failed storage unit 102.

Further, block 206 includes building a data mirror of the failed storage unit in the hot spare based on the determined data of the other portion of memory of the failed storage unit. Continuing the aforementioned example, although portion A data of storage unit 102 is stored in the hot spare 110, there remains the need to rebuild the data of portions B and C of the failed storage unit 102 in order to fully or at least partially rebuild the failed storage unit within the hot spare 110. For example, to rebuild portions B and C of failed storage unit 102, the RAID controller 108 may use the data of portions B and C of storage units 104 and 106. More particularly, the data of portions B and C may be recomputed based on the data of portions B and C of storage units 104 and 106, and the recomputed data may overwrite the data in portions 114 and 116 of the hot spare 110. Subsequently, the data of the failed storage unit 102 is contained in the hot spare and may be used for routine or any other subsequent operations of the system. The storage space allocated to the storage units is apportioned based on errors. For example, storages units having a higher number of errors are given a greater amount of storage space in the hot spare.

Figure 3:
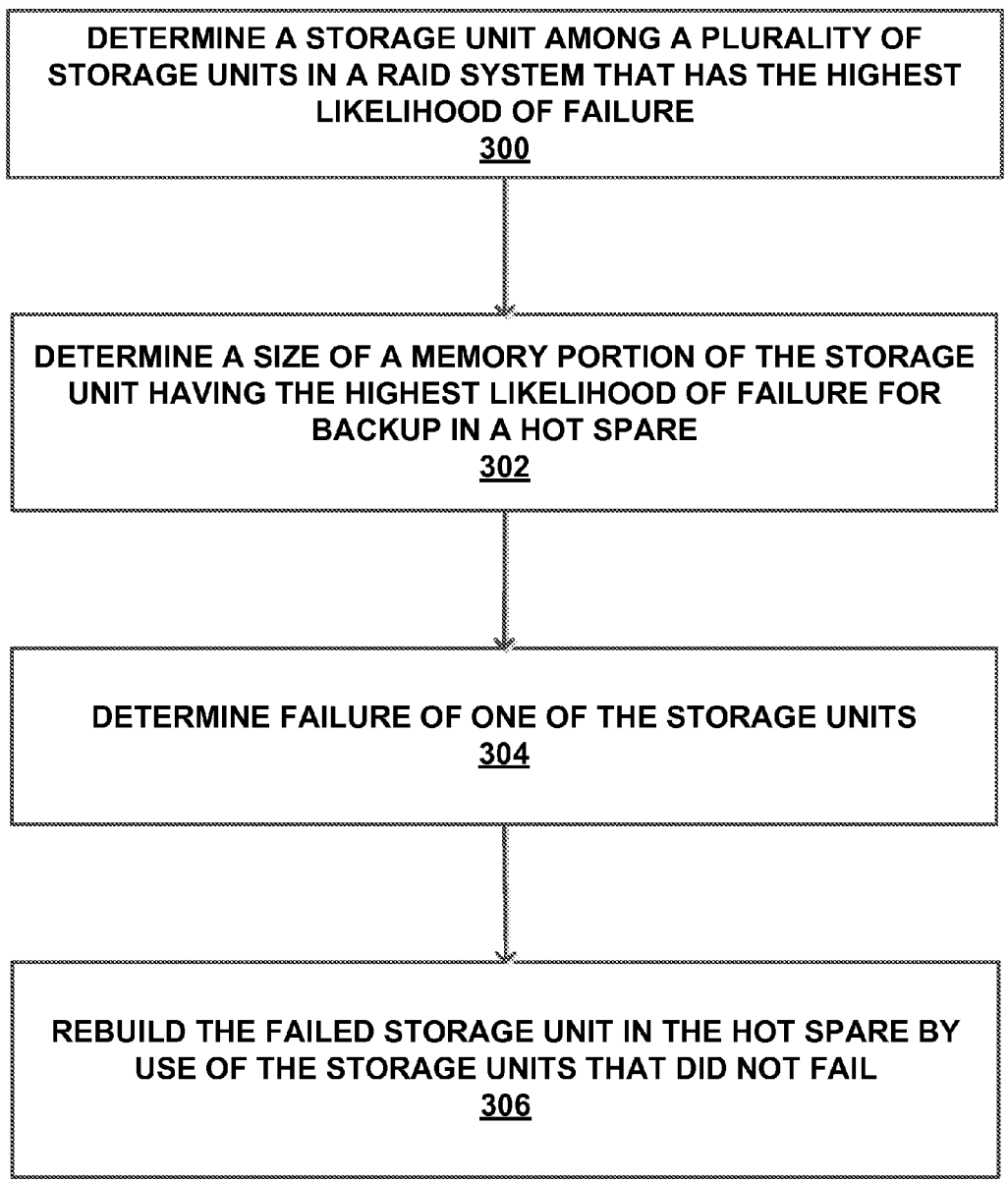
FIG. 3 illustrates a flowchart of another example method for RAID backup management in accordance with embodiments of the present invention.

FIG. 3 illustrates a flowchart of another example method for RAID backup management in accordance with embodiments of the present invention. In examples described herein to illustrate the method, reference is made to the RAID controller 108 shown in FIG. 1, although any suitable controller may be utilized. Further, the method is described in examples as being implemented in a RAID 5 system with the components shown in FIG. 1, although the method may be implement in any suitable RAID system.

Referring now to FIG. 3, the method includes determining 300 a storage unit among a plurality of storage units in a RAID system that has the highest likelihood of failure. For example, the RAID controller 108 may determine a characteristic of each storage unit 102, 104, and 106 that is indicative of a likelihood of failure. In an example, the RAID controller 108 may determine the number of errors within a recent time period for each of the storage units. Such errors may be indicative of a likelihood of failure for the storage units. It may be assumed that the storage unit having the highest number of errors is most likely to fail. Example errors include media errors and command timeouts. Other examples include error logs in the drive. The logs can be polled periodically to check whether the drive has logged any drives against itself.

The method of FIG. 3 includes determining 302 a size of a memory portion of the storage unit having the highest likelihood of failure for backup in a hot spare. Continuing the aforementioned example, a size of the portion of memory allocated in the hot spare 110 for storage of data from storage unit 102 may be greater than the memory sizes allocated for storage units 104 and 106, because storage unit 102 has the highest likelihood of failure. The reasoning is that, in the case of failure of storage unit 102, the rebuild time will be less than other storage units because a high amount of the data for storage unit 102 has already been stored in the hot spare 110. In this example, the size of portion A of the storage unit 102 for storage in the hot spare 110 may be greater than the portions stored in the hot spare 110 for the other storage units 104 and 106.

It is also noted that the sizes of memory portions allocated in the hot spare may be based upon the likelihood of failure for all or some of the storage units. For example, storage unit 106 may have the least likelihood of failure (e.g., no or a small number of errors in comparison to other storage units in the RAID system). In this case, storage unit 106 may be allocated the smallest or no portion of the hot spare 110 for storage of its data. The allocation of storage size on the hot spare for each storage unit may be based upon the relative likelihood of failure of the storage units. In other words, the storage unit with the highest likelihood of failure may be allocated the highest storage size, the storage unit with the next highest likelihood of failure may be allocated the next highest storage size, and so on.

The method of FIG. 3 includes determining 304 failure of one of the storage units. Continuing the aforementioned example, storage unit 102 may fail. In this case, a portion (e.g., portion A) of storage unit 102 has already been backed up to the hot spare 110. Subsequently, the method includes rebuilding 306 the failed storage unit in the hot spare by use of the storage units that did not fail. For example, the RAID controller 108 may use the data in portions B and C of storage units 104 and 106 for rebuilding the corresponding portions B and C in the hot spare 110. The RAID controller 108 may compute the data for these portions and store them in portions B and C 114 and 116 of the hot spare 110.

Subsequent to the storage unit 102 being rebuilt in the hot spare 110, the RAID controller 108 may switch over to use of the hot spare 110 in place of the failed storage unit 102. Operators may then replace or suitably repair the failed storage unit. Once the failed storage unit has been replaced or repaired, the replacement or repaid storage unit, the RAID controller 108 may use the data in the hot spare 110 to populate the new storage unit.

In accordance with embodiments of the present invention, a RAID controller may utilize a hot spare for generating a proactive partial mirror of data in each drive or storage unit of a RAID system. The data in the hot spare may be updated in real-time with updated data from the drives. As a single drive in the array shows signs of failure such as, but not limited to, media error, PFA, or other errors, the RAID controller may adjust to the changing conditions by allocating more space or a larger portion of the hot spare for mirroring data. Further, the RAID controller may make a proactive minor strip placement of data from the non-failing drives such that a portion of the drive can be streamed from the data on the hot spare to further shorten rebuild time. When the hot spare is engaged at or subsequent to the point of failure, the data needed to rebuild the RAID array and come out of a critical state sooner is already present in the partial mirror of the failed drive on the hot spare. The minor stripes present on the hot spare can be streamed to the RAID controller for rebuild and that allows the original members of the array to service customer data requests rather than being encumbered with rebuild requests.

In accordance with embodiments of the present invention, a location of errors of a failing drive may be determined and that location mirrored to the hot spare. For example, media errors may be traced to a particular area of memory. The RAID controller may identify this area for mirroring to the hot spare. As a result, media error retries can pull data from the hot spare mirror rather than waiting on parity generation to recreate the data on the RAID array.

In accordance with embodiments of the present invention, a configuration tool for RAID management may provide an operator with the ability to choose to associate a hot spare to the RAID array as a local hot spare or as a global hot spare. Global hot spares may service multiple arrays, whereas a local hot spare may service a specific array. If the operator chooses to configure a local hot spare, an additional option may be to provide the operator with the choice of creating an enhanced rebuild time that allows the hot spare to have multiple purposed depending on the state of the array. When the array is set to the optimal mode, the hot spare may function as a partial mirror to every drive in the array. As an example, a 3 drive RAID 5 with a hot spare may be created with each drive being broken down into 3 zones or portions per drive. One zone from each of these drives may be tied to a zone on the hot spare, and that hot spare zone becomes a mirrored pair with the associated RAID zone. The fewer the number of drives in the RAID array, the better the reduction in rebuild time. It is also noted that when data is written to a zone having a mirror in the hot spare, the mirrored zone in the hot spare will also be written with the same data.

If a drive in a RAID array, such as a RAID 5 array, fails, the hot spare may logically fill the place of the failed drive and a rebuild may then occur. The new drive in the array, which was previously the hot spare, may have an updated copy of a portion (e.g., ⅓) of the data on the drive that failed. The RAID controller may create a watermark on the new rebuilding drive in two zones that previously were mirrored to the two "live" drives. The two watermarked zones can now rebuild either in parallel or in a serial manner. The portion of the hot spare that contained relevant data from the failed drives may not have to be rebuilt as the data is already up to date. As a result, only ⅔ of the drive had to be rebuilt, thus reducing the rebuild time by ⅓ in this example. In scenarios in which the rebuild time is 15 hours normally, the rebuild time may be reduced by 5 hours.

It is also noted that the rebuild of the data on the new drive that was formerly a hot spare can also leverage other smaller pieces of data from the other drives in the array that happen to still reside on that drive. If the hot spare is used as a replacement for a drive and that drive had 50% of the data already on the hot spare and it was a 3 drive RAID array, this means the other two drives in the array hold 25% each of their data on the hot spare that was just brought in as a replacement drive. As the RAID controller draws up data to rebuild the hot spare into the replacement drive, it can pull data from the two original drives to recreate the missing data. The hot spare that is being converted can also supply some of the data for those two drives for the rebuild since it has updated copies of that data. This can also help the rebuild finish quicker since it adds a third device supplying data to the controller for rebuilding. The data can spool off the hot spare as the rebuild replaces that space with data pertaining to the replaced drive's data set and use it in addition to the data the controller is getting off of the other two remaining drives to add additional speedup to the rebuild.

In a rebuilding state, the RAID array may read data from all the existing drives to recreate missing data until the read build is complete or the data falls on the completed side of the watermark, which tracks the progress of the rebuild. A read operation on the affected drive which would have results in a single IO, takes 3 IOs. The two drives that are optimal may have their corresponding minor stripe read, the missing stripe on the failed drive may be recreated using parity and then the result is written onto the rebuilding drive on the new stripe. This process can cause, in this example, for the performance to reduce by 33% or more of what it was when the array was optimal with similar effects to response time characteristics. On larger RAID arrays, the performance effect can be even more as there are now more drives needed to conduct a full write stripe, such as a 10 drive RAID 5 may have to read data from 9 drive stripes instead of three to recreate the missing data on the failed drive. In an example described herein, the performance degradation down to 33% can be shortened by 5 hours with this by repurposing a drive that is in standby mode and not being utilized actively for anything. The 15 hours rebuild time expressed in the example is based on a 6 TB array built on 3 2 TB drives with a rebuild rate of 100 MB/second, and any extra bandwidth in the array may be capable of being consumed to run that array workload.

In accordance with embodiments of the present invention, in the event that one of the drives in the RAID 5 array experiences issues (e.g., media errors, a PFA alert, communications issues, or the like) with the RAID or SAS initiator, the zones established and tracked on both drives as well as the actual mirrored data on the hot spare can be altered to allow a larger ratio or portion for the device that is having an issue. If a drive is identified as having issues, it may be more likely from a statistical point of view to fail and the user may have the option to configure the array such that information such as this may be allow the hot spare to leverage the knowledge and create more space for mirroring to that device. This may include having the entire drive mirrored on the hot spare. If the issues are focused on a physical location on a drive, the zones chosen for addition to the hot spare can be focused on the failing areas such that retries on media errors can be directed to the hot spare as well as allow for higher ratio of that drive to be stored on the hot spare.

Further, regarding the example of a failing drive, as the odds of the drive marked as failing increase, the zone of the hot spare associated with the failing drive can be increased in size or moved to a new zone if a specific area on the drive appears to be failing. If a specific area of a drive is failing, the hot spare may be used to return the data in the event a media error or other error occurs on the original array member, thus saving response time on a data request. As it becomes clear that this drive receiving the largest portion of the hot spare zoning is the most likely to fail, or alternatively in a configurable manner, the hot spare can switch the smaller zones on the hot spare to align such that the hot spare holds the minor stripes of the other drives such that an even greater portion of the failed drive can be rebuilt with data that can be streamed from the hot spare. In this way, other drives in the array may be freed to provide data and the rebuild can be completed more quickly. Referring again to FIG. 1 for example, if storage unit 102 fails and a portion B (or zone B) on storage unit 102 was identified as likely to hold the failing section, and as such the hot spare has 50% of its capacity filled with an oversized portion B from storage unit 102, the other zones on the hot spare can be altered to hold corresponding stripes on other drives outside of that zone. The drive may fail and the hot spare may take over. Further, the largest portion of the data may immediately be marked as rebuilt as it was in synch with the hot spare. The hot spare can use the other zones that have been filled with data tied to major stripes other than the ones associated with data in the oversized area. The minor stripes may be physically laid in place on the hot spare in such a way that they can be streamed off the drive for maximum throughput and quickest rebuild times. The minor stripes for other drives in the array can be placed on the hot spare in such a way that they flow to the RAID controller in a streaming manner for maximum throughput for quickest delivery to the RAID controller. This may allow the data for rebuilding additional major stripes to be streamed to the RAID controller from the hot spare and used to rebuild data while reducing interference with data being pulled from the other drives in the array. The original array members can go about their business of serving IO requests while the hot spare streams the data to the RAID controller. This can mean that the array not only has quicker rebuild times but that performance impact to the array is reduced. This may also allow, in the event the most likely to fail drive is not actually the next drive to fail, for some amount of reduced rebuild time to still be realized. In the event the array is large enough so that the rebuild occurs faster by no streaming minor stripes from the hot spare, it may be configurable so that an operator can make the decision when to perform the rebuild in one way or another.

In accordance with embodiments, portions of the hot spare allocated for backing up storage units may be adjusted based on a determined likelihood of one or more of the storage units failing. Referring to FIG. 1 for example, the RAID controller 108 may determine that storage unit 1 102 is more likely to fail than the other storage units due to a higher number of errors reported for storage unit 1 102 than the other storage units. In this case, a greater portion of space on the hot spare 110 may be allocated for storage unit 1 102 than the other storage units.

In accordance with embodiments, rebuild of a storage unit may include use of data from other storage units in the array as well as the associated hot spare. Referring to FIG. 1 for example, storage unit 1 102 may fail. In response to failure of storage unit 1 102, the mirror of portion A of storage unit 1 112 on the hot spare may be used for rebuild of storage unit 1 112. In addition, the RAID controller 108 may use portions B of storage unit 2 104 and storage unit 3 106 together with the mirrored portion B of storage unit 2 114 within the hot spare 110 for rebuilding portion B of storage unit 1 102. Likewise, the RAID controller 108 may use portions C of storage unit 2 104 and storage unit 3 106 together with the mirrored portion C of storage unit 2 116 within the hot spare 110 for rebuilding portion unit C of storage unit 1 102. By use of data from the multiple sources of storage unit 2 104, storage unit 3 106, and the hot spare 110, storage unit 1 102 may be more efficiently and quickly rebuilt than by just using storage units 2 and 3.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    identifying portions of data in each of a plurality of storage units of a redundant array of independent disks (RAID) system;
    backing up data in the identified portions to a hot spare;
    comparing at least one characteristic of the storage units to each other;
    determining allocation of storage space for the hot spare based on the comparison;
    comparing a likelihood of failure of the storage units to each other; and
    allocating storage space in the hot spare for the backup based on the comparison of the likelihood of failure of the storage units to each other.

2. The method of claim 1, wherein the RAID system is one of a RAID 5 system and a RAID 6 system.

3. The method of claim 1, further comprising determining the at least one characteristic of one of the storage units, and wherein allocating storage space comprises determining the allocation of storage space in the hot spare based on the characteristic.

4. The method of claim 3, wherein determining a characteristic comprises comparing the likelihood of a failure of the storage units by determining a likelihood of failure of the one of the storage units.

5. The method of claim 1, wherein comparing at least one characteristic comprises determining the storage unit having the highest likelihood of failure among the storage units, wherein the size of the identified allocation of the storage space of the storage unit having the highest likelihood of failure is greater than the sizes of the memory of the other storage units.

6. The method of claim 1, further comprising determining a portion of one of the storage units associated with one or more errors, wherein the identified portion of the one of the storage units corresponds to the portion associated with one or more errors.

7. The method of claim 1, further comprising:
  determining failure of one of the storage units; and
  in response to determining the failure, switching over to use of the hot spare as a partially rebuilt replacement in place of the failed storage unit.

8. The method of claim 1, further comprising using data in the hot spare to populate a storage unit for replacement of a failed storage unit.

\* \* \* \* \*